(12) United States Patent
Hara

(10) Patent No.: US 9,183,473 B2
(45) Date of Patent: Nov. 10, 2015

(54) IMAGE FORMING APPARATUS HAVING FUNCTION OF AVOIDING OVERFLOW OF BUFFER AND IMAGE FORMING METHOD

(71) Applicant: KYOCERA Document Solutions Inc., Osaka (JP)

(72) Inventor: Hiroyuki Hara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/473,180

(22) Filed: Aug. 29, 2014

(65) Prior Publication Data
US 2015/0062637 A1 Mar. 5, 2015

(30) Foreign Application Priority Data

Aug. 30, 2013 (JP) ................................. 2013-179378

(51) Int. Cl.
| | | |
|---|---|---|
| G06F 3/12 | (2006.01) | |
| G06K 15/02 | (2006.01) | |
| G06K 15/00 | (2006.01) | |
| G06F 13/12 | (2006.01) | |

(52) U.S. Cl.
CPC .......... *G06K 15/1817* (2013.01); *G06K 15/401* (2013.01)

(58) Field of Classification Search
None
See application file for complete search history.

(56) References Cited

U.S. PATENT DOCUMENTS

| | | | | |
|---|---|---|---|---|
| 6,804,411 | B1 * | 10/2004 | Hanna ........................... | 382/276 |
| 2001/0052038 | A1 * | 12/2001 | Fallon et al. ..................... | 710/68 |
| 2008/0198404 | A1 * | 8/2008 | Saito et al. .................... | 358/1.15 |
| 2011/0225378 | A1 * | 9/2011 | Hara ............................. | 711/155 |

FOREIGN PATENT DOCUMENTS

| | | | |
|---|---|---|---|
| JP | 2007-179496 A | | 7/2007 |
| JP | 2007179496 A | * | 7/2007 |

\* cited by examiner

*Primary Examiner* — Marivelisse Santiago Cordero
*Assistant Examiner* — Neil R McLean
(74) *Attorney, Agent, or Firm* — McDonnell Boehnen Hulbert & Berghoff LLP

(57) ABSTRACT

An image forming apparatus includes a plurality of buffers, an auxiliary storage unit, a data receiving unit, a data transmitting unit, an asynchronous data write unit, a data prefetch unit, a data deletion unit, and an image forming unit. The data receiving unit inputs data into one of the plurality of buffers. The data transmitting unit outputs the stored data. The asynchronous data write unit stores the stored data into the auxiliary storage unit. The data prefetch unit prefetches, if no data to be output exists in another one of the plurality of buffers, the data stored in the auxiliary storage unit to the another one of the plurality of buffers. The data deletion unit deletes the data, transmitting of which has been completed. The image forming unit performs image formation for the data as page data.

17 Claims, 10 Drawing Sheets

IMAGE FORMING APPARATUS HAVING FUNCTION OF AVOIDING OVERFLOW OF BUFFER AND IMAGE FORMING METHOD

INCORPORATION BY REFERENCE

This application is based upon, and claims priority to corresponding Japanese Patent Application No. 2013-179378, filed in the Japan Patent Office on Aug. 30, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus having a function of avoiding an overflow of a buffer ascribable to input data and an image forming method.

BACKGROUND

A typical image forming apparatus performs printing by processing data input continuously. As an example, the typical image forming apparatus, such as a multifunction peripheral (MFP), a printer, or the like, prints print data of an original read from a scanner or document data received via a network at a specified engine speed by using an image forming unit.

However, in the typical image forming apparatus, when a system memory has an insufficient capacity compared to input data, a buffer may overflow, potentially causing corruption of input data in the system memory or loss of input data.

SUMMARY

The present disclosure relates to an image forming apparatus having a function of avoiding an overflow of a buffer ascribable to input data, and an image forming method.

In one embodiment, an image forming apparatus includes a plurality of buffers, an auxiliary storage unit, a data receiving unit, a data transmitting unit, an asynchronous data write unit, a data prefetch unit, a data deletion unit, and an image forming unit. The data receiving unit is configured to receive first data provided by a particular output unit into a first buffer from among the plurality of buffers. The data transmitting unit is configured to transmit the first data stored in the first buffer. The asynchronous data write unit is configured to asynchronously store the first data stored in the first buffer into the auxiliary storage unit. The data prefetch unit is configured to prefetch second data stored in the auxiliary storage unit by the asynchronous data write unit to a second buffer from among the plurality of buffers. The data deletion unit configured to delete the first data stored in the first buffer if the data transmitting unit completes a transmission of one of the prefetched second data and the first data input by the data receiving unit. The image forming unit configured to perform image formation of the first data onto a page.

In another embodiment, an image forming method is performed. The method includes receiving first data provided by a particular output unit into a first buffer from among a plurality of buffers. The method also includes transmitting the first data stored in the first buffer. The method further includes asynchronously storing the first data stored in the first buffer into an auxiliary storage unit. Additionally, the method includes prefetching second data stored in the auxiliary storage unit to a second buffer from among the plurality of buffers. Further, the method includes deleting the first data stored in the first buffer if a transmission of one of the prefetched second data and the first data input by the data receiving unit completes. The method also includes performing image formation of the first data onto a page.

In yet another embodiment, a non-transitory computer-readable medium having instructions stored thereon is provided that, upon execution by one or more processors, performs a set of operations. The operations include receiving first data provided by a particular output unit into a first buffer from among a plurality of buffers. The operations also include transmitting the first data stored in the first buffer. The operations further include asynchronously storing the first data stored in the first buffer into an auxiliary storage unit. Additionally, the operations include prefetching second data stored in the auxiliary storage unit to a second buffer from among the plurality of buffers. Further, the operations includes deleting the first data stored in the first buffer if a transmission of one of the prefetched second data and the first data input by the data receiving unit completes. The operations also include performing image formation of the first data onto a page.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
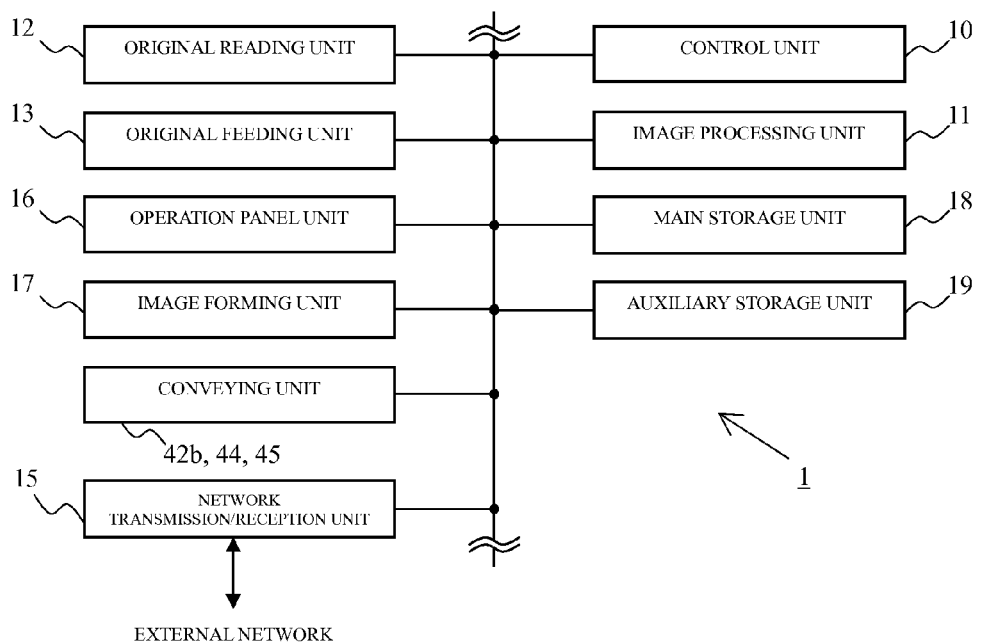
FIG. 1 is a schematic diagram illustrating a block configuration of an image forming apparatus according to an embodiment of the present disclosure.

FIG. 1 is a schematic diagram illustrating a block configuration of an image forming apparatus 1.

The image forming apparatus 1 includes an image processing unit 11, an original reading unit 12, an original feeding unit 13, a conveying unit (a sheet feeding roller 42b, a conveying roller 44, and a delivery roller 45), a network transmission/reception unit 15, an operation panel unit 16, an image forming unit 17, a main storage unit 18, and an auxiliary storage unit 19, which are connected to a control unit 10 via a bus or the like. The respective units are controlled by the control unit 10.

The control unit 10 is an information processing device such as a general purpose processor (GPP), a central processing unit (CPU), a micro processing unit (MPU), a digital signal processor (DSP), a graphics processing unit (GPU), and an application specific integrated circuit (ASIC).

Figure 2:
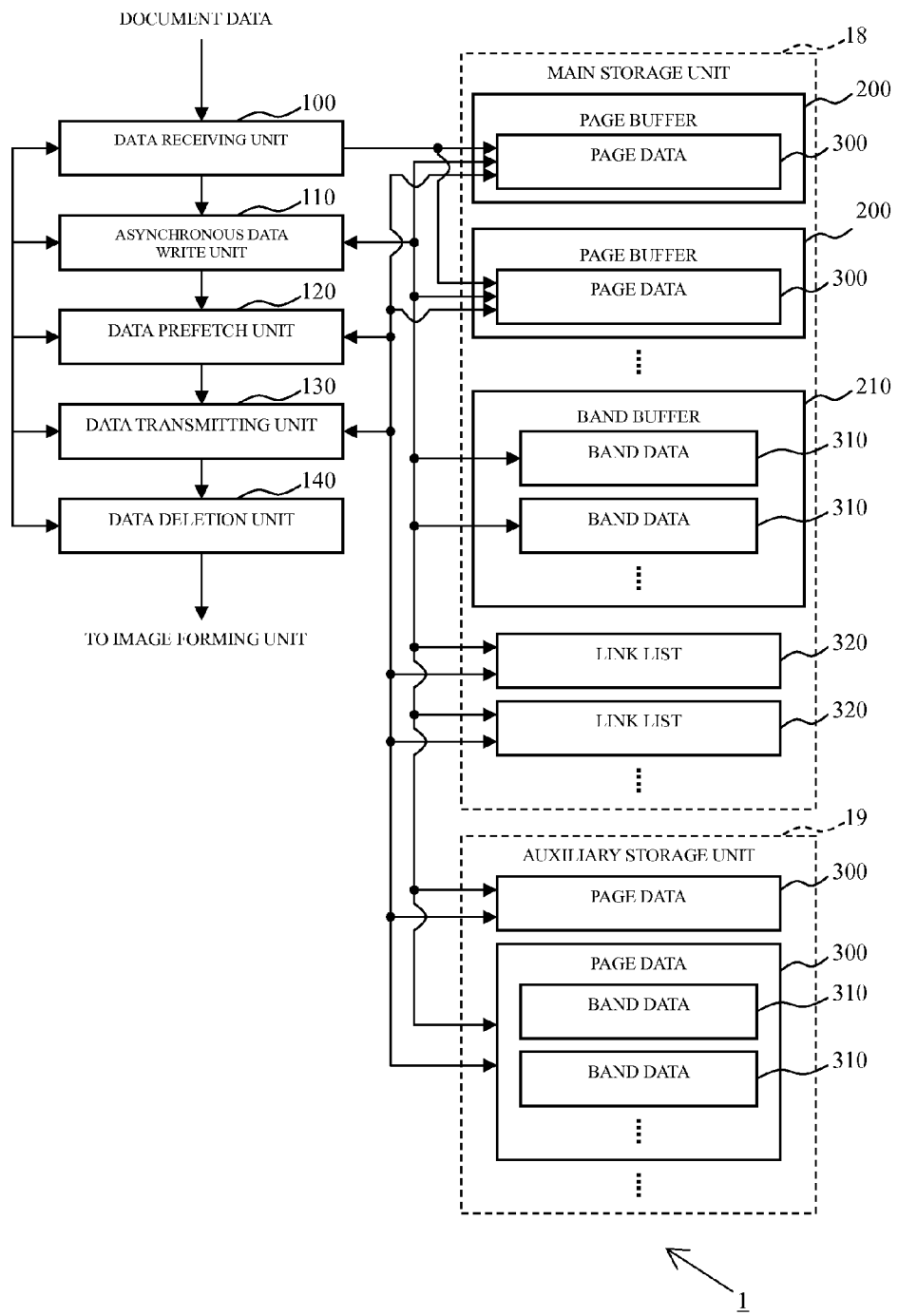
FIG. 2 is a schematic diagram of a flow of document data in the image forming apparatus.

The control unit 10 causes the image forming apparatus 1 to operate as respective units illustrated in FIG. 2 by reading a control program stored in a ROM or an HDD of the auxiliary storage unit 19 and expanding the control program into a RAM of the main storage unit 18 to execute the control program. The control unit 10 controls the entire image forming apparatus in accordance with specified instruction information input from an external terminal (not illustrated) or the operation panel unit 16.

The image processing unit 11 is a control arithmetic device such as a digital signal processor (DSP) or a graphics processing unit (GPU). The image processing unit 11 is a device that performs specified image process for image data, and performs various kinds of image process such as enlargement/reduction, density adjustment, gradation adjustment, and image improvement.

The image processing unit 11 stores an image read by the original reading unit 12 in the auxiliary storage unit 19 as print data. The image processing unit 11 may convert the print data into a file unit having a format of PDF, TIFF, or the like.

The original reading unit 12 is a device that reads an original that is set thereon.

The original feeding unit 13 is a device that conveys an original to be read by the original reading unit 12.

The image forming unit 17 is a device that performs, in accordance with a user's output instruction, image formation on a recording paper from data stored in the auxiliary storage unit 19, data read by the original reading unit 12, or data received from the external terminal.

The conveying unit conveys a recording paper from a sheet feeding cassette (not illustrated), causes the image forming unit 17 to perform the image formation thereon, and then conveys the recording paper to a stack tray (not illustrated).

The network transmission/reception unit 15 is a network connection device including a LAN board or a radio transmitter/receiver for connecting to an external network such as a LAN, a wireless LAN, a WAN, or a cellular phone network.

The network transmission/reception unit 15 uses a line for data communications to transmit and/or receive data, and uses a voice telephone line to transmit and/or receive a voice signal.

The operation panel unit 16 includes a display unit such as an LCD. The operation panel unit 16 also includes an input unit that includes the following: a numeric keypad; buttons for start, cancel, and switch among operation modes for copy; a FAX transmission unit; a scanner; and a touch panel for issuing instructions to execute jobs relating to printing, transmission, storing, recording, and the like of the selected document.

The operation panel unit 16 receives the user's instructions for various jobs to be performed by the image forming apparatus 1. The operation panel unit 16 may input or change information on each user in accordance with the user's instruction.

The main storage unit 18 is a storage device. The main storage unit 18 may be a semiconductor memory, such as a dynamic random access memory (DRAM), an SRAM, or an MRAM. The main storage unit 18 stores the program and data read from the auxiliary storage unit 19 to be expanded.

The auxiliary storage unit 19 is a storage device such as a read only memory (ROM), a solid state drive (SSD), an onboard semiconductor memory, or a hard disk drive (HDD). The auxiliary storage unit 19 stores various programs and data.

The auxiliary storage unit 19 stores the control program for performing operation control for the image forming apparatus 1. Further, the auxiliary storage unit 19 may include an area for a storage folder for each user.

The auxiliary storage unit 19 may have a read/write speed that is faster than a particular speed, such as a speed at which the data transmitting unit 130 (FIG. 2) outputs data.

The auxiliary storage unit 19 may perform writing and/or reading by using a direct memory access (DMA) transfer without using the control unit 10. Further, the auxiliary storage unit 19 may include a controller dedicated to writing and/or reading.

In the image forming apparatus 1, the control unit 10 and the image processing unit 11 may be formed integrally as in a CPU or the like integrated with a GPU or a chip-on-module package.

A RAM, a ROM, a flash memory, or the like may be built into the control unit 10 and the image processing unit 11.

The image forming apparatus 1 may include a FAX transmission/reception unit that performs facsimile transmission and/or reception.

FIG. 2 is a schematic diagram illustrating an example of a flow of document data in the image forming apparatus 1.

The image forming apparatus 1 includes a data receiving unit 100, an asynchronous data write unit 110, a data prefetch unit 120, a data transmitting unit 130, and a data deletion unit 140.

The main storage unit 18 has areas reserved for a plurality of page buffers 200 and a band buffer 210. The main storage unit 18 stores link lists 320. Page data 300 is stored in the page buffer 200. A plurality of pieces of band data 310 are stored in the band buffer 210. The each link list 320 refers to a particular page data 300 and the band data 310 within document data 500. In some instances, each link list includes a memory address by which to identify the particular page data 300 or band data 310.

The page data 300 is stored in the auxiliary storage unit 19.

Document data 500 is provided to the data receiving unit 100 by the original reading unit 12, an external terminal or server (not illustrated) connected to the network transmission/reception unit 15, an external recording medium (not illustrated), or the like.

The asynchronous data write unit 110 stores the document data 500 provided by the data receiving unit 100 to one of the plurality of page buffers 200 in terms of a unit of the page data 300 used as a specified output unit. The asynchronous data write unit 110 stores the page data 300 stored in one of the page buffers 200 to the auxiliary storage unit asynchronously to transmitting performed by the data transmitting unit 130.

When the page data 300 has been written to all the page buffers 200 and if the page data 300 in the document data 500 provided by the data receiving unit 100 cannot be stored to any one of the page buffers 200, the asynchronous data write unit 110 stores each unit of the band data 310—which forms a part of the page data 300 and is a specified unit having a smaller size than the page data 300—to the band buffer 210 and the auxiliary storage unit 19. The page data 300 includes a specified number of pieces of the band data 310.

When a request for reception of a given page data 300 is received from the data transmitting unit 130, in a case where the page data 300 output subsequently to the given page data 300 stored in one of the page buffers 200 does not exist in the page buffer 200, the data prefetch unit 120 reads the page data 300 stored to the auxiliary storage unit by the asynchronous data write unit 110 onto another page buffer 200. In other words, the data prefetch unit 120 "prefetches" the page data 300 subsequent to the page data 300 received in response to the request for reception of the page data 300.

The data transmitting unit 130 reads the page data 300 prefetched by the data prefetch unit 120 and stored to one of the page buffers 200 or the page data 300 provided from the data receiving unit 100 and stored to one of the page buffers 200 from the page buffer 200 in units of the page data 300, and outputs the page data 300 at a specified speed. When reading, the data transmitting unit 130 transmits an event for a page reception request serving as the request for reception of the page data 300 to the other respective units.

The data deletion unit 140 deletes data having a specified output unit, the transmitting of which has been completed, from one of the page buffers 200. The data deletion unit 140 transmits an event for erasing a page.

The data receiving unit 100, the asynchronous data write unit 110, the data prefetch unit 120, the data transmitting unit 130, and the data deletion unit 140 transmits and receives at least the following events to one another: the events for the page reception request and for erasing the page, an event for the write request for the page data 300 in the page buffer 200; an event for starting/completing writing and reading of the page data 300 to the page buffer 200; an event for starting/completing writing and reading of the page buffer 200 or the band buffer 210 to and/or from the auxiliary storage unit 19; and an event for starting/completing writing and reading of the band data 310 to and/or from the band buffer 210. For example, the respective units receive an event in a waiting status, and adjust a timing depending on the event, to perform each process described later.

The control unit 10 of the image forming apparatus 1 executes the control program stored in the auxiliary storage unit 19, to thereby cause the image forming apparatus 1 to function as the data receiving unit 100, the asynchronous data write unit 110, the data prefetch unit 120, the data transmitting unit 130, and the data deletion unit 140.

The respective units of the image forming apparatus 1 are hardware resources that execute an image forming method according to the present disclosure.

Figure 3:
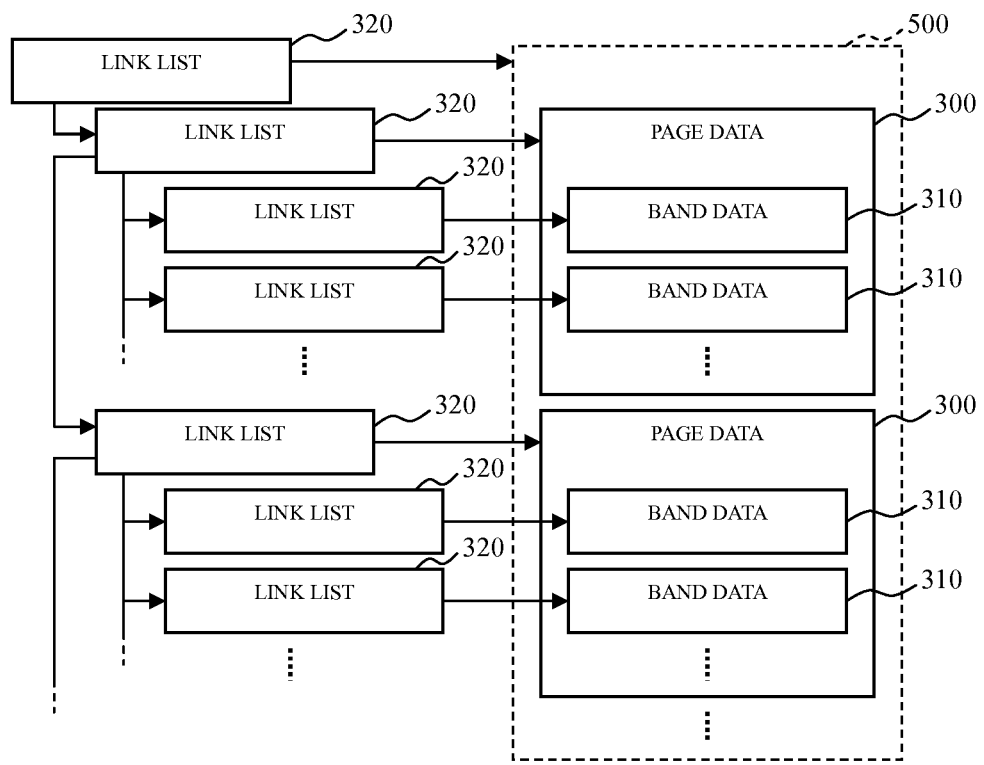
FIG. 3 is a schematic diagram illustrating a block configuration of the document data in the image forming apparatus.

FIG. 3 is a schematic diagram illustrating a block configuration of the document data input by the data receiving unit 100 of the image forming apparatus 1.

The document data 500 includes at least one piece of page data 300. The page data 300 is data that includes a specified output unit. The page data 300 includes a specified number of pieces of band data 310 obtained by combining a plurality of lines each including a specified output unit. The band data 310 is data having a specified unit smaller than that of the page data 300 that includes a specified output unit.

The document data 500, the page data 300, and the band data 310 are each referred to by the link list 320.

In order to speed up a search for the band data 310, it is preferred that, for example, the link list 320 employ a data structure having a three-tier tree structure formed of a layer of a list of the document data 500 (document data layer), a layer of a list of the page data 300 (page data layer), and a layer of a list of the band data 310 (band layer). In this case, for example, the document data layer and the page data layer are each the link list 320 for a branch node, and the band layer is the link list 320 for elements.

In the document data 500, a physical address space is mapped to a logical address space by the link list 320. With this mapping, the document data 500 is seamlessly output from the data transmitting unit 130 as if the document data 500 were output sequentially.

The link list 320 may be referred to regardless of whether or not the page data 300 and the band data 310 are stored in the main storage unit 18 and the auxiliary storage unit 19.

Figure 4:
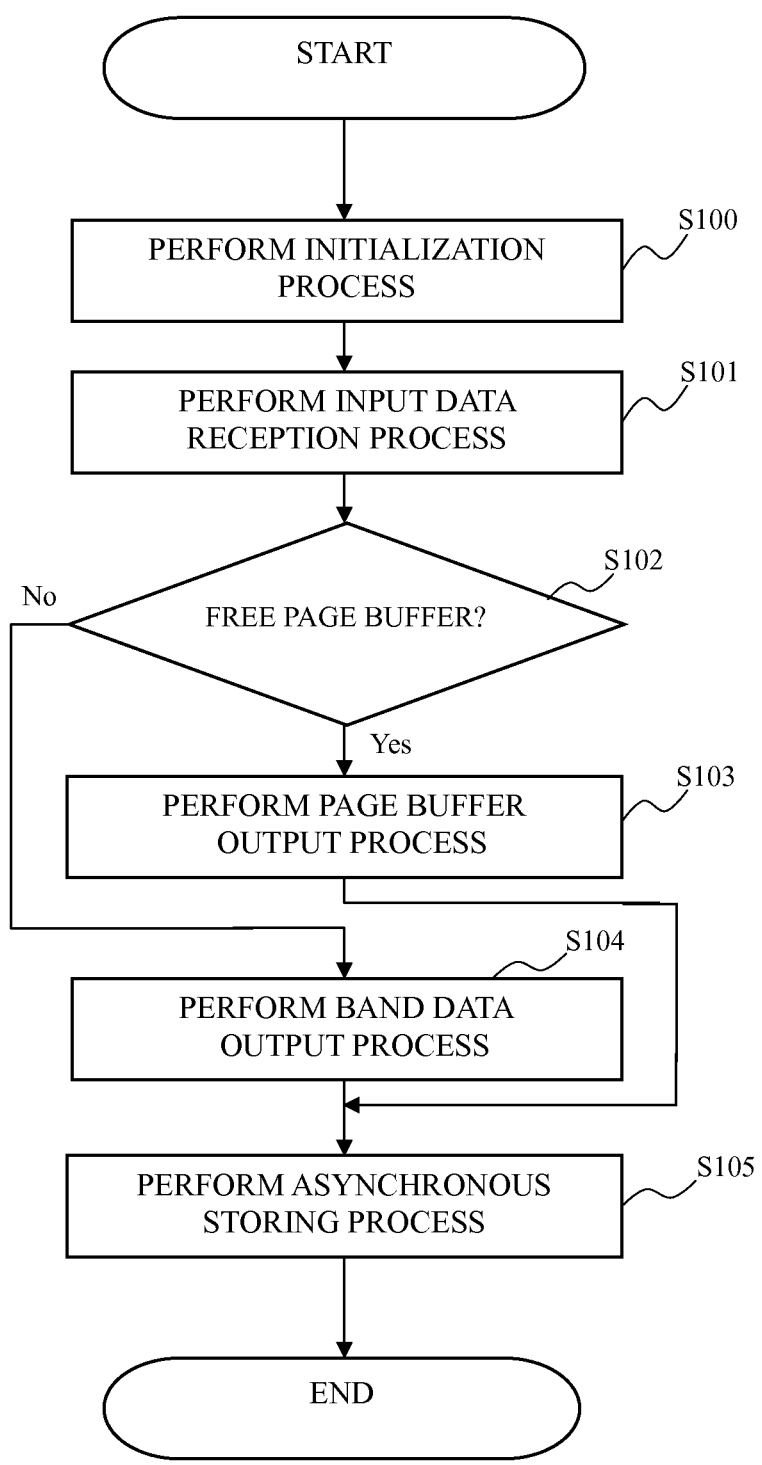
FIG. 4 is a flowchart of asynchronous data storing process performed by the image forming apparatus.
Figure 5:
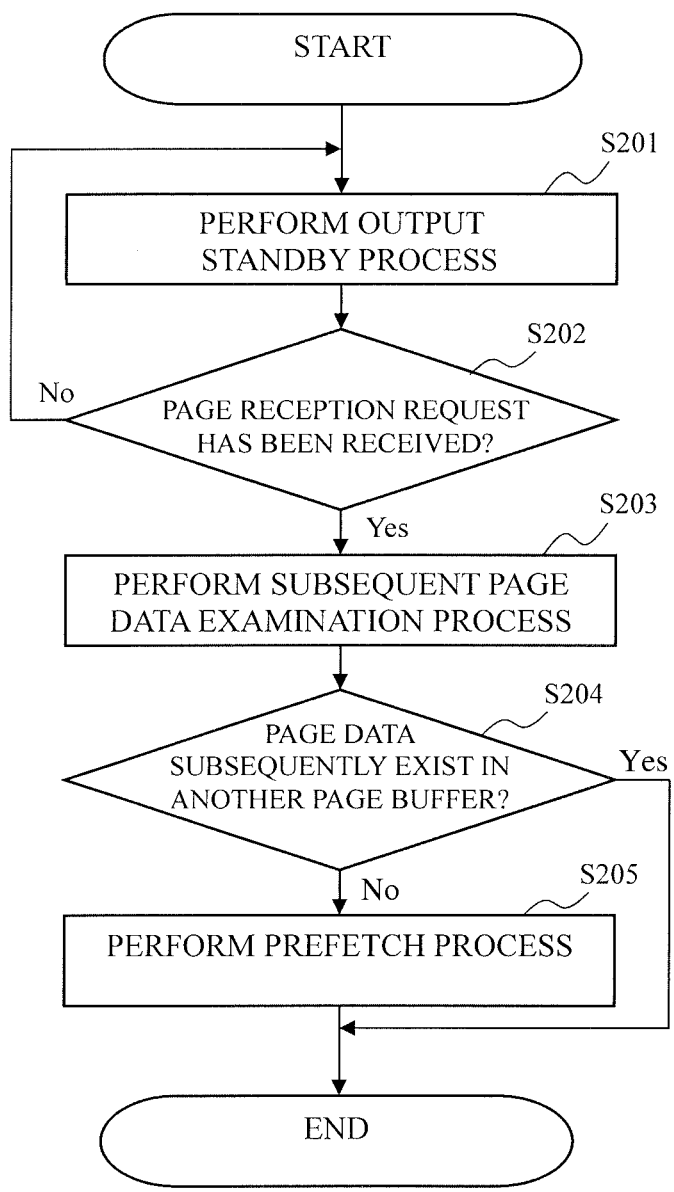
FIG. 5 is a flowchart of data prefetch process performed by the image forming apparatus.
Figure 6:
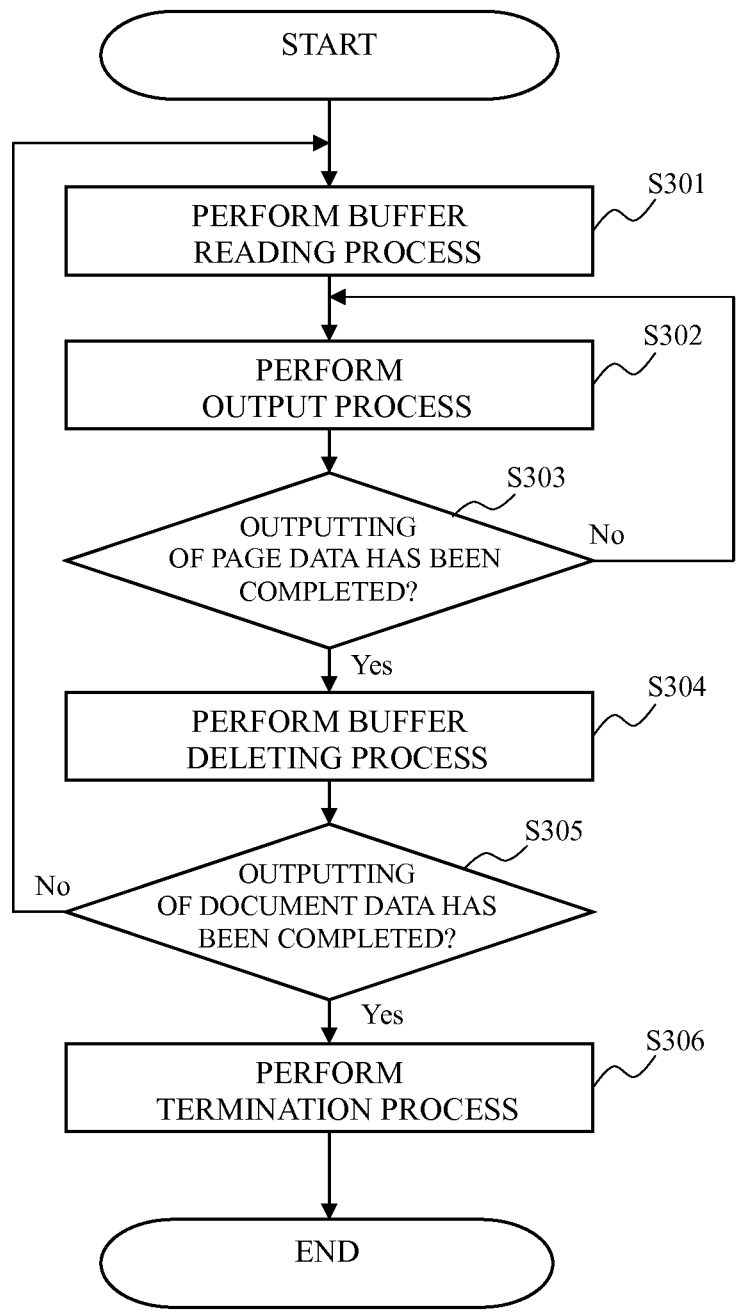
FIG. 6 is a flowchart of data output process performed by the image forming apparatus.

FIG. 4 is a flowchart of asynchronous data storing process performed by the image forming apparatus 1. FIG. 5 is a flowchart of data prefetch process performed by the image forming apparatus 1. FIG. 6 is a flowchart of data output process performed by the image forming apparatus 1. FIGS. 7 to 10 are diagrams illustrating other examples of the flow of the document data in the image forming apparatus 1.

In the asynchronous data storing process, the data prefetch process, and the data output process performed by the image forming apparatus 1, the input document data 500 is read to and written from the page buffer 200, the band buffer 210, and the auxiliary storage unit 19 in order to be output at the image forming unit 17 at a specified speed. Further, image forming apparatus 1 performs a process from the receiving of the document data 500 to transmitting that is managed as one job.

The above-mentioned process may be realized by the control unit 10 expanding the program stored in the auxiliary storage unit 19 onto the main storage unit 18 and executing the program in cooperation with the respective units by using the hardware resources. Further, the above-mentioned process may be realized by the control unit 10 activating a plurality of threads and a plurality of processes (hereinafter referred to as "thread"). The asynchronous data storing process, the data prefetch process, and the data output process are realized by performing writing and/or reading in units of files simultaneously in parallel by the asynchronous data write unit 110, the data prefetch unit 120, and the data transmitting unit 130 and the data deletion unit 140, respectively. That is, the control unit 10 operates the writing and reading of the data in units of files in parallel by using separate threads.

The asynchronous data storing process, the data prefetch process, and the data output process are described step by step with reference to the flowcharts illustrated in FIGS. 4 to 6, respectively.

In Step S100, the control unit 10 performs initialization process.

When starting a job, the control unit 10 reserves and clears areas for the page buffer 200 and the band buffer 210 in the main storage unit 18, to bring the areas into a "free" state.

In order to perform the writing to and reading from the auxiliary storage unit 19 in parallel, the control unit 10 generates and activates threads for respectively causing the writing to and/or reading from the auxiliary storage unit 19. The control unit 10 generates and activates threads that are respectively dedicated to the writing and the reading per job for the document data 500. Both requests for the asynchronous storing performed by the asynchronous data write unit 110 and for the synchronous/asynchronous writing/reading performed by the data prefetch unit 120 are performed via the threads. The control unit 10 refers to the page data 300 in the page buffer 200 or the like when receiving an event for the document data 500 for the designated job by the thread.

For this asynchronous reading and writing, a queue for transmitting the event to the thread may be stored to the main storage unit 18.

It may be desirable that a message queue (which may be implemented using MsgQueue ( )) using POSIX not be used due to incapability of canceling the event that has already been sent. The respective threads for the writing and reading cause the page data 300 or the band data 310 to be referred to, and hence the link list 320 stored on the main storage unit 18 may be included and transmitted. Further, the queue may be provided to have a size that, for example, suits a size of the document data 500.

Further, in the data prefetch process performed by the data prefetch unit 120 and the data output process performed by the data transmitting unit 130, the processes for the writing and reading are performed in the same manner by generating the threads.

Note that, in FIG. 7 to FIG. 10, the band data 310 corresponding to respective page data pieces 300a to 300d is indicated as band data pieces 311a to 311c, band data pieces 312a to 312c, band data pieces 313a to 313c, and band data pieces 314a to 314b, respectively.

In Step S101, the control unit 10 performs input data reception process.

The control unit 10 receives one piece of page data 300 in the document data 500 from the data receiving unit 100.

The control unit 10 receives the document data 500, which is transmitted from another terminal or server (not illustrated) continuously and sequentially, from the network transmission/reception unit 15.

The control unit 10 may read the original placed on the original reading unit 12 as the document data 500 to receive the document data 500.

The control unit 10 may receive the document data 500 from the recording medium (not illustrated) connected to an outside.

In Step S102, the control unit 10 determines whether or not a free page buffer from the plurality of page buffers 200 reserved in the main storage unit 18 exists. The control unit 10 determines Yes when there is a "free" page buffer 200 that can store the page data 300. Otherwise, the control unit 10 determines No.

In the case of Yes, the control unit 10 advances the process to Step S103.

In the case of No, the control unit 10 advances the process to Step S104.

In Step S103, the control unit 10 performs page buffer output process when the page buffers 200 include a free one.

The control unit 10 stores the page data 300 input from the data receiving unit 100 to one of the "free" page buffers 200 among the plurality of page buffers 200. After completion of storing to the page buffer 200, the control unit 10 transmits the event for completing the writing to the page buffer 200.

Figure 7:
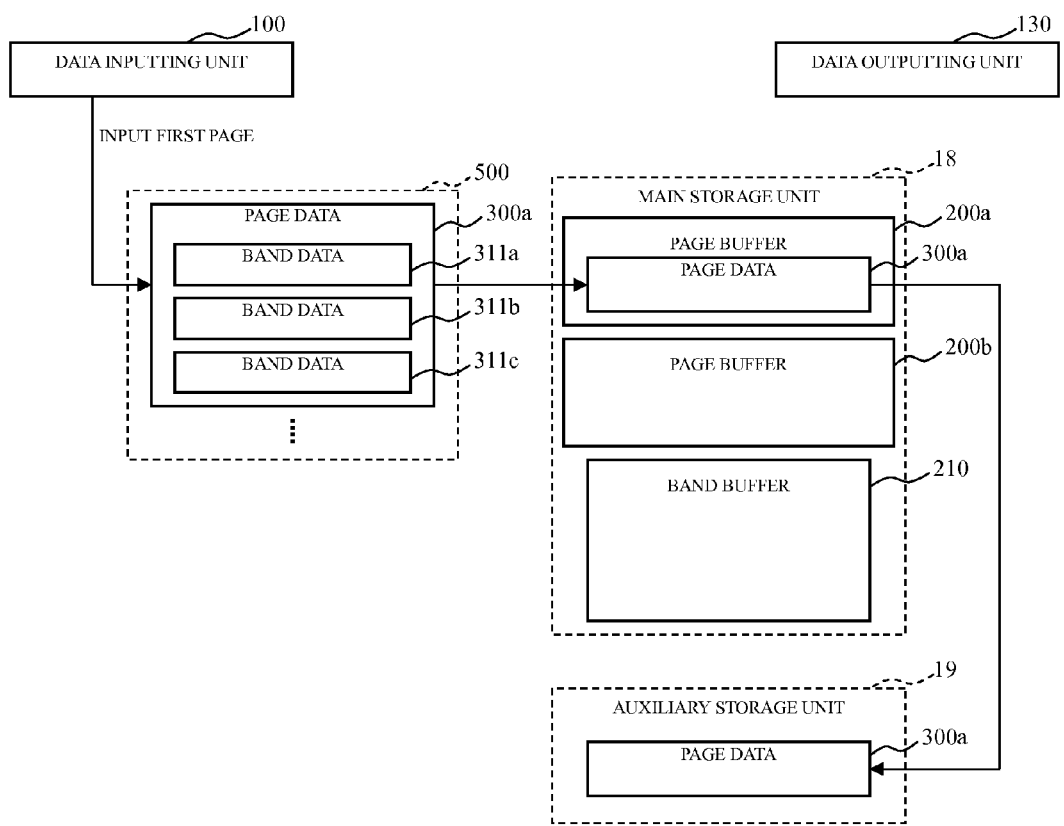
FIGS. 7 to 10 are schematic diagrams illustrating other examples of the flow of the document data in the image forming apparatus.
Figure 8:
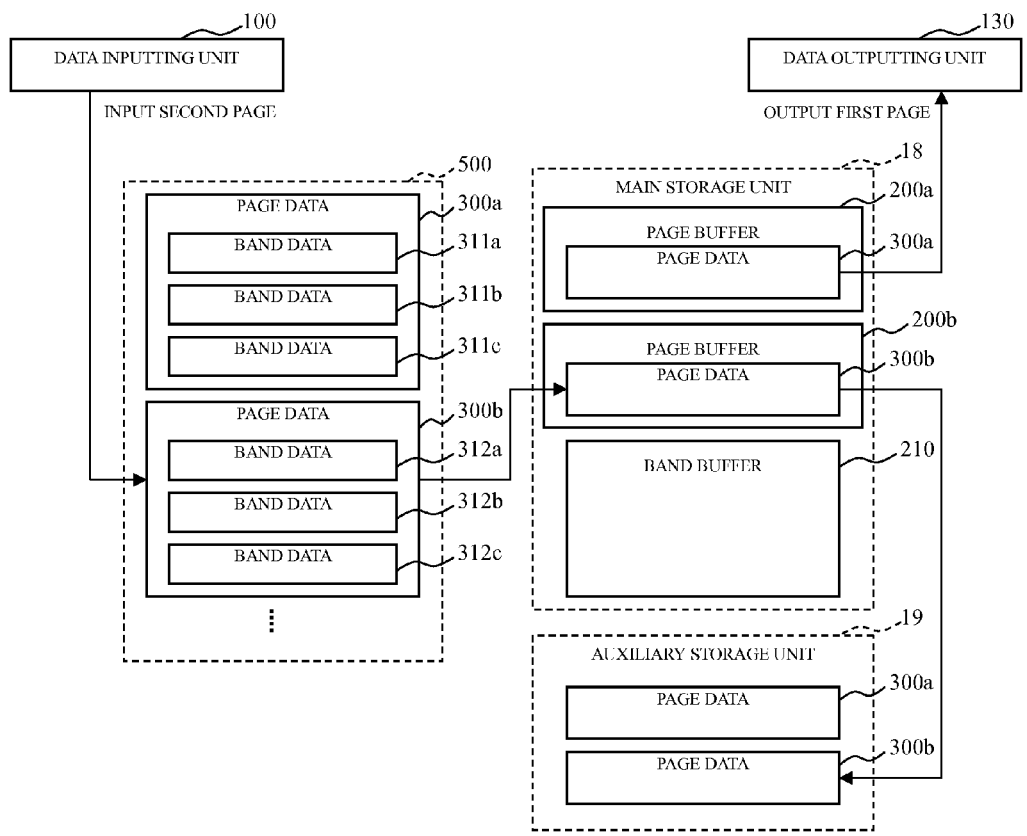

In the example illustrated in FIG. 7, the page data piece 300a is stored in a page buffer 200a before the data is output from the data transmitting unit 130. In the example of FIG. 8, the page data piece 300b is stored while the page data piece 300a is being output from the data transmitting unit 130.

After that, the control unit 10 advances the process to Step S105.

In regard to the input page data 300, the control unit 10 may enable a mode in which the page data 300 is stored to the auxiliary storage unit 19 without erasing a page buffer from the main storage unit 18.

The control unit 10 may perform management using the thread in order to manage opening and closing of the document data 500 by way of the job. At this time, not only the writing but also the reading may be performed by the dedicated thread.

In Step S104, the control unit 10 performs band data output process when the page buffers 200 do not include a free one.

When the data input by the data receiving unit 100 cannot be stored to the page buffer 200, the control unit 10 stores each piece of data having a unit of the band data 310 smaller than that of the page data 300 to the auxiliary storage unit 19.

Figure 9:
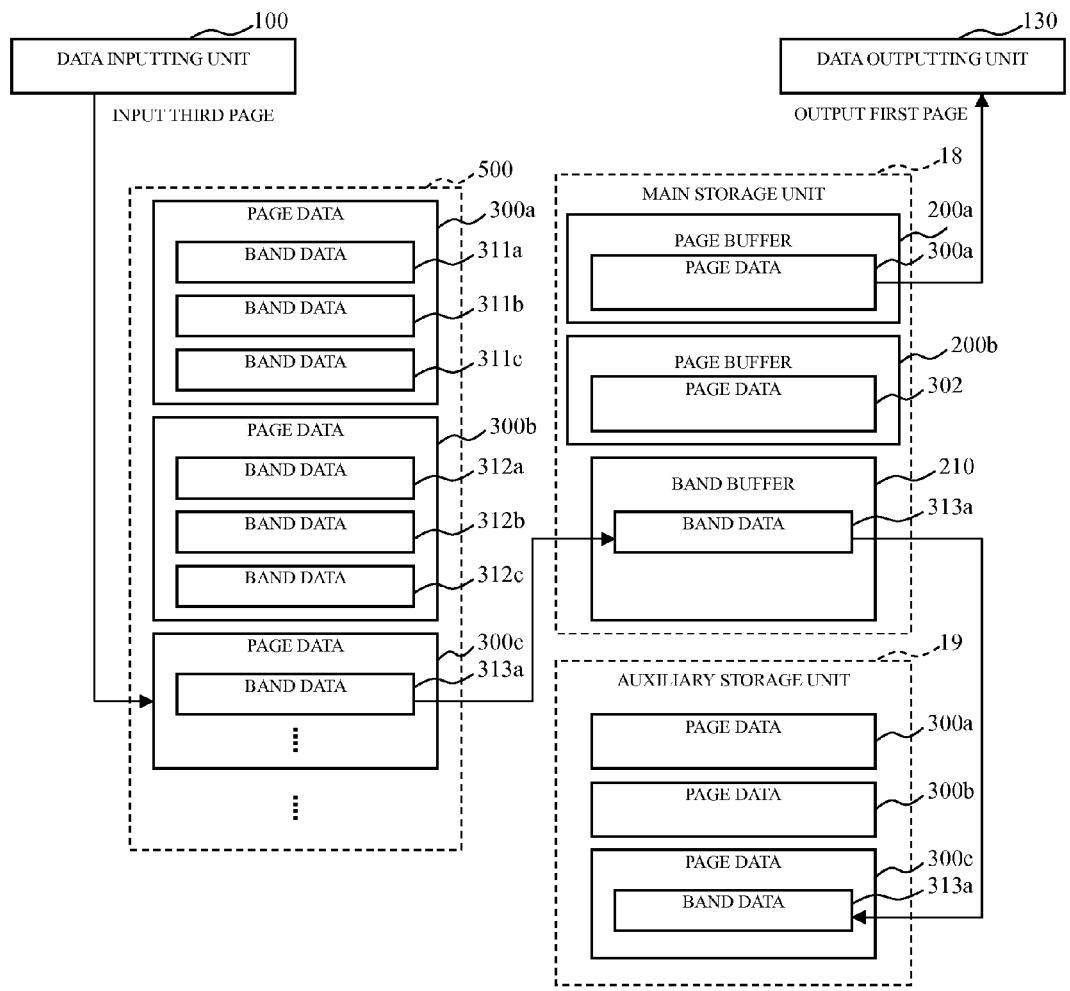

Referring to FIG. 9, when there is no "free" page buffer 200, for example, the control unit 10 stores the band data 310 in the page data 300 to the band buffer 210 that can store at least two pieces of band data 310. The control unit 10 sets a mode in which the band data 310 in the band buffer 210 is deleted after storing to the auxiliary storage unit 19. In the example of FIG. 9, the control unit 10 stores the band data piece 313a in the page data piece 300c to the band buffer 210.

The control unit 10 transmits the event for completing the writing of the band data 310 each time storing of the band data 310 to the band buffer 210 is completed.

In Step S105, the control unit 10 performs the asynchronous storing process.

The control unit 10 stores the page data 300 stored in one of the page buffers 200 to the auxiliary storage unit 19 asynchronously.

Referring to FIG. 7 and FIG. 8, the control unit 10 keeps storing the page data 300 input from the data receiving unit 100 to the auxiliary storage unit 19, and inhibits data input performed by the data receiving unit 100 from being stopped. In FIG. 7, the page data piece 300a stored in the page buffer 200a is stored to the auxiliary storage unit 19. In FIG. 8, the page data piece 300b stored in a page buffer 200b is stored to the auxiliary storage unit 19.

The control unit 10 performs storing to the auxiliary storage unit 19 asynchronously by the thread for the writing separate from the thread for the reading. The control unit 10 writes data to the file by dividing the data in units of, for example, 4 KB from the page buffer 200 or the band buffer 210 by the thread for the writing, performs flushing (by performing, for example fflush ( )) or the like, and completes the writing.

The control unit 10 transmits the event for completing the writing of the page data 300 after storing to the auxiliary storage unit 19.

In the case of the thread for the writing, the control unit 10 transmits the file name of the file to be written to the thread for the reading, and generates a file handle to cause the writing to the auxiliary storage unit 19. In the standby state, the thread for the reading notifies that the writing of the thread for the writing to the auxiliary storage unit 19 has been finished. The thread for the reading generates another file handle by the received file name to cause the reading from the auxiliary storage unit 19.

The control unit 10 writes and flushes the page data 300 in units of the band data 310 in order of opening, repeating writing and flushing, then closing. Therefore, one file handle suffices for one piece of page data 300. Further, the control unit 10 writes and/or reads the page data 300 in units of the band data 310, which allows another piece of band data 310 to be read while writing the band data 310, and writing and reading is operated in parallel.

When the writing of the page buffer 200 or the band buffer 210 is finished, the control unit 10 notifies the respective units of an event for finishing the writing.

The control unit 10 sets the link list 320 for the band layer after the writing of the band data 310 is finished, and sets the link list 320 for the branch of the page data layer when the writing of the page data 300 is finished. When the link list 320 is exhausted, waiting process may be effected, and after the page buffer 200 is erased, retry process for receiving the link list 320 may be performed again when an event for releasing the link list 320 is received.

Each time the event for completing the writing of the band data 310 is received in the band data output process, the control unit 10 may store the band data 310 to the auxiliary storage unit 19 and erase the band data 310 from the band buffer 210. The control unit 10 examines whether or not the band data 310 stored in the auxiliary storage unit 19 has reached the size of the unit of the page data 300, and when the unit of the page data 300 is reached, transmits an event for completing storing of the page data 300 to the auxiliary storage unit 19.

The data prefetch process performed by the data prefetch unit 120 is described with reference to FIG. 5.

In Step S201, the control unit 10 performs output standby process.

The control unit 10 stands by while a page transmitting unit is transmitting the page.

In the data prefetch process, the control unit 10 stands by until the event for the page reception request is received.

In Step S202, the control unit 10 determines whether or not the page reception request has been received. The control unit 10 determines Yes when the event for the page reception request is received from the data transmitting unit 130. Otherwise, the control unit 10 determines No.

In the case of Yes, the control unit 10 advances the process to Step S203.

In the case of No, the control unit 10 returns the process to Step S201 to keep standing by.

In Step S203, the control unit 10 performs subsequent page data examination process when the page reception request is received.

The control unit 10 examines that there exists a page buffer 200 in which the page data 300 received in response to the page reception request by the data transmitting unit 130 is stored.

The control unit 10 searches other page buffers 200 to examine whether or not there is page data 300 output subsequently to the above-mentioned page data 300.

In Step S204, the control unit 10 determines whether or not the page data 300 to be output subsequently exists in another page buffer 200.

The control unit 10 determines Yes when in the subsequent page data examination process, the page data 300 to be subsequently output by the data transmitting unit 130 is retrieved from another page buffer 200. The control unit 10 determines No when the page data 300 to be output subsequently to the page data 300 received in response to the page reception request by the data transmitting unit 130 does not exist in another page buffer 200.

In the case of Yes, the control unit 10 brings the data prefetch process to an end.

In the case of No, the control unit 10 advances the process to Step S205.

In Step S205, the control unit 10 performs prefetch process when the page data 300 subsequent to the page data 300 output in response to the page reception request received from the data transmitting unit 130 does not exist in another page buffer 200.

The control unit 10 reads the subsequent page data 300 from the auxiliary storage unit 19 to a "free" page buffer 200 of the main storage unit 18 prior to the transmitting of the page data 300 from the data transmitting unit 130.

Figure 10:
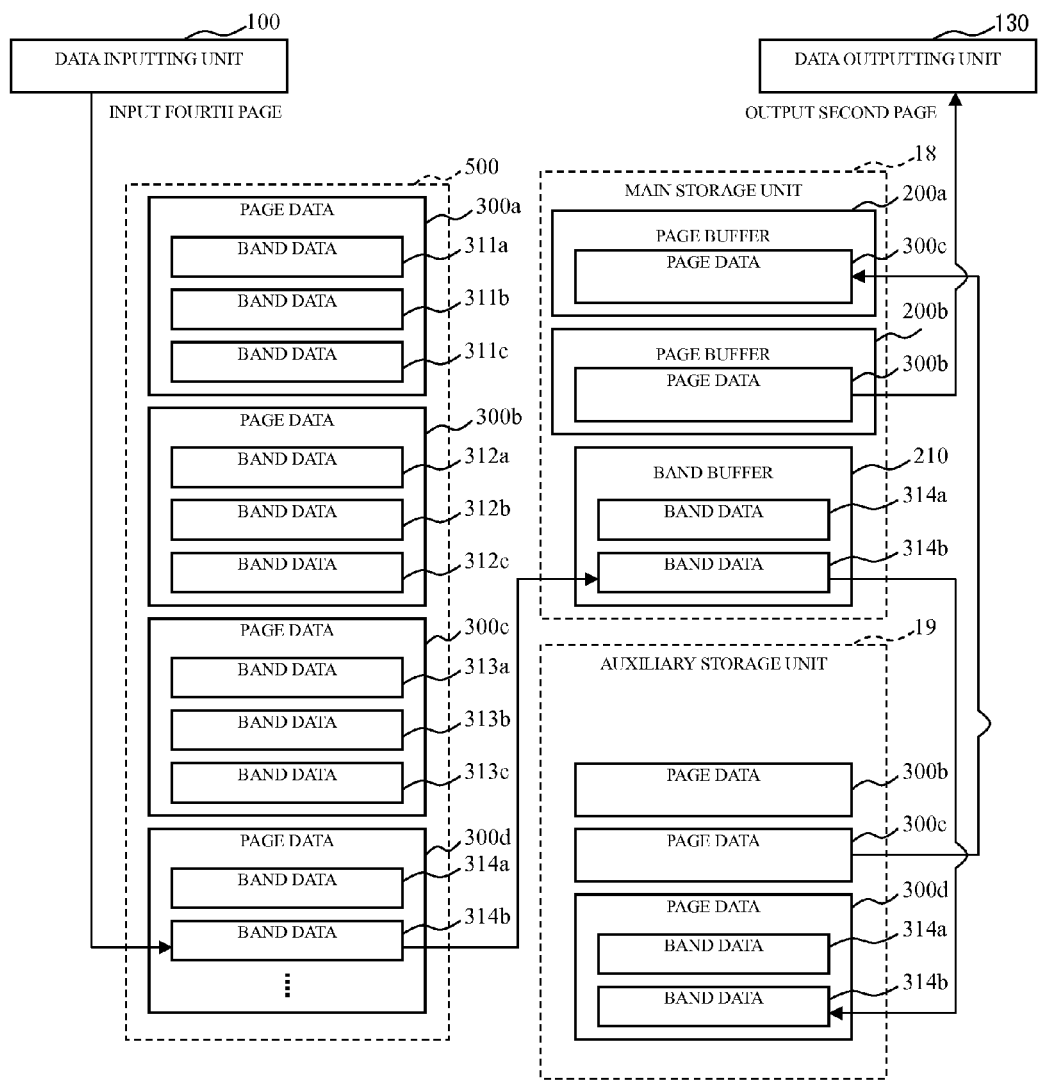

Referring to FIG. 10, the control unit 10 stores the page data piece 300c subsequent to the page data piece 300b output by the data transmitting unit 130 to the page buffer 200a.

When the page data 300 to be read is being written to the auxiliary storage unit 19 by the asynchronous data write unit 110 or exists in the link list 320 for the thread for the writing, the page data 300 remains on the page buffer 200 of the main storage unit 18. Therefore, the control unit 10 may set the link list 320 by using the page data 300 as it is, and transmit an event for stopping the writing on the auxiliary storage unit 19 side to the asynchronous data write unit 110.

When a memory capacity of the main storage unit 18 has a free space, the control unit 10 may read a plurality of pieces of page data 300. Next time the page reception request for the page data 300 read onto another page buffer 200 is received from the data transmitting unit 130, the control unit 10 may set the link list 320 so as to allow the reading in real time (actual time). The control unit 10 may prefetch, for example, two pieces of band data 310 in the subsequent page data 300 onto the band buffer 210.

The data output process performed by the data transmitting unit 130 and the data deletion unit 140 is described with reference to FIG. 6.

In Step S301, the control unit 10 performs buffer reading process by the data transmitting unit 130.

The control unit 10 transmits the event for the page reception request. The control unit 10 designates the page buffer 200, from which the reading is to be performed, from the link list 320 used to refer to the page data 300 to be read. As this page buffer 200 to be designated for the reading, the control unit 10 can designate any one of the page buffer 200 in which the page data 300 input from the data receiving unit 100 is stored and the page buffer 200 in which the page data 300 prefetched by the data prefetch unit 120 is stored.

The control unit 10 transmits the event for starting the reading when the page data 300 is read from the designated page buffer 200 to effect a state that allows the transmitting.

The control unit 10 may examine whether or not the data having a size corresponding to an amount to be read is written in the designated page buffer 200 at the time of the reading. When the data having the size corresponding to the amount to be read is not written, the control unit 10 may stop the transmitting, wait to receive the event for the completion of the writing of the page data 300 to the page buffer 200 performed by the asynchronous data write unit 110, and execute the reading again.

In Step S302, the control unit 10 performs output process by the data transmitting unit 130.

The control unit 10 reads the page data 300 from the designated page buffer 200, outputs the page data 300 at a specified speed, and transmits the page data 300 to the image forming unit 17. At this time, when performance of the reading from the auxiliary storage unit 19 is faster than the speed of the transmitting of the page data 300, the transmitting can be performed at the specified speed.

Referring to FIG. 8 to FIG. 10, the control unit 10 outputs the page data 300 from the designated page buffer 200. In the examples illustrated in FIG. 8 and FIG. 9, the control unit 10 is transmitting the page data piece 300a from the page buffer 200a. In the example illustrated in FIG. 10, the control unit 10 is transmitting the page data piece 300b from the page buffer 200b.

In Step S303, the control unit 10 determines whether or not the transmitting of the page data 300 has been completed by the data transmitting unit 130. In the examples illustrated in FIG. 8 and FIG. 9, the control unit 10 determines Yes when the transmitting of the page data piece 300a from a designated page buffer 200a is completed. In the example illustrated in FIG. 10, the control unit 10 determines Yes when the transmitting of the page data piece 300b from a designated page buffer 200b is completed. Otherwise, the control unit 10 determines No.

In the case of Yes, the control unit 10 advances the process to Step S304.

In the case of No, the control unit 10 returns the process to Step S302 to keep transmitting the page data 300.

In Step S304, the control unit 10 performs buffer deleting process by the data deletion unit 140 when the transmitting of the page data 300 from the page buffer 200 is completed.

The control unit 10 erases the page data 300 of the auxiliary storage unit 19 the reading of which has been finished by the data transmitting unit 130. This brings the page buffer 200 to a "free" state. The control unit 10 advances the link list 320 for the erased page data 300, and releases the link list 320 for the erased page data 300 and the link list 320 for the band data 310. The page data 300 in the page buffer 200 to which the advanced link list 320 now refers becomes data to be output.

The control unit 10 transmits the event for erasing the page after completing erasing the page data 300.

In the examples illustrated in FIG. 8 and FIG. 9, the control unit 10 deletes the page data piece 300a from the page buffer 200a. In the example illustrated in FIG. 10, the control unit 10 deletes the page data piece 300b from the designated page buffer 200b.

In the buffer deleting process, when the event for erasing the page is received, the control unit 10 may erase the page buffer 200, from which the page data 300 has been stored to the auxiliary storage unit 19, to bring the areas into a "free" state.

Therefore, it is easy to reserve the page buffer 200 for which the data prefetch process is to be performed by the data prefetch unit 120.

In Step S305, the control unit 10 determines whether or not the transmitting of the document data 500 has been completed by the data transmitting unit 130.

The control unit 10 determines Yes when the transmitting of all pieces of page data 300 in the document data 500 is completed. Otherwise, the control unit 10 determines No.

In the case of Yes, the control unit 10 advances the process to Step S306.

In the case of No, the control unit 10 returns the process to Step S301 to keep transmitting the page data 300.

In Step S306, the control unit 10 performs termination process by the data transmitting unit 130 and the data deletion unit 140 when the transmitting of the document data 500 is completed.

When the transmitting of the document data 500 is completed, the control unit 10 may delete, from the queue, all the threads for writing files other than one with the closing of the file being currently processed.

A command to asynchronously write the document data 500 on the job to be finished to the auxiliary storage unit 19 may remain in the queue for the thread for the writing. The termination of the job is delayed by waiting until write process with respect to the auxiliary storage unit 19, which is stacked in the queue, has all been finished. Therefore, it is no longer necessary to perform the needless write process with respect to the auxiliary storage unit 19 by deleting the threads for the writing from the queue, which can speed up the fishing of the job.

The control unit 10 also deletes the page data 300 and the band data 310 stored in the auxiliary storage unit 19, to release all the link lists 320.

With the above-mentioned process, the data output process according to the embodiment of the present disclosure is brought to an end.

The above-mentioned process can make the following effect.

When a related-art typical image forming apparatus stops due to paper jam, missing paper, or the like, input data is received from a scanner, a network, or the like, and hence the capacity of the memory becomes insufficient, which causes a buffer to overflow.

The image forming apparatus 1 according to the embodiment of the present disclosure includes: the data receiving unit 100 that inputs the page data 300; the asynchronous data write unit 110 that stores the page data 300 input from the data receiving unit 100 to one of the plurality of page buffers 200 in terms of the specified output unit, and asynchronously stores the page data 300 having a specified output unit stored in one of the page buffers 200 to the auxiliary storage unit; the data prefetch unit 120 that reads the page data 300 stored to the auxiliary storage unit by the asynchronous data write unit 110 onto another page buffer 200 when the page data 300 having a specified output unit to be output subsequently to the data output from one of the page buffers 200 does not exist in another page buffer 200; and the data transmitting unit 130 that reads the page data 300 prefetched by the data prefetch unit 120 or the page data 300 input from the data receiving unit 100 from the page buffer 200 in terms of the specified output unit, outputs the page data 300 at a specified speed, and deletes the data having a specified output unit, the transmitting of which has been completed, from one of the page buffers 200.

With the above-mentioned configuration, even when the image forming unit 17 stops the transmitting due to paper jam, missing paper, or the like, the main storage unit 18 is not occupied by the page data 300 in the input document data 500. The buffer of the main storage unit 18 is prevented from overflowing due to the receiving from the data receiving unit 100, and hence continuous printing is performed. Further, the data receiving unit 100 does not stop due to an insufficient memory capacity of the main storage unit 18, and hence stable printing is continued.

When a data input speed of the related-art typical image forming apparatus is faster than an image formation speed, the data input speed depends on an output speed. The data input stops caused by waiting to receive the page data 300, and hence the subsequent data is inhibited from being input, which is inefficient.

In the image forming apparatus 1 according to the embodiment of the present disclosure, the image formation speed is faster than the data input speed, and image processing speed is also faster than the data input speed. In addition, when the area for the page buffer 200 corresponding to two pieces of page data 300 is reserved on the main storage unit 18, the image formation is continuously performed at as high a speed as the data receiving unit 100 inputs the page data 300.

Further, the page data 300 needs to be on the buffer in order that the page data 300 input from the network transmission/reception unit or the original reading unit is received by the data transmitting unit in real time. In the related-art typical image forming apparatus, when an HDD or the like is involved in reception of the page data 300, the page data 300 cannot be received in real time, which inhibits transmitting performance from being reserved.

After storing the page data 300 to one of the plurality of page buffers 200, the image forming apparatus 1 according to the embodiment of the present disclosure asynchronously stores the page data 300 to the auxiliary storage unit 19, and prefetches up to the subsequent page data 300. In addition, when a speed of storing to the auxiliary storage unit 19 is faster than an input speed of the data receiving unit 100, the transmitting is performed by the data transmitting unit 130 without reducing a speed at which the page data 300 is input from the data receiving unit 100.

When the asynchronous data write unit 110 cannot store the data input by the data receiving unit 100 to the page buffer 200, the image forming apparatus 1 according to the embodiment of the present disclosure stores the page data 300 to the auxiliary storage unit in terms of a specified unit having a smaller size than that of the page buffer 200.

When the input data cannot be stored to the page buffer 200, the input data is stored into the auxiliary storage unit 19 in terms of a specified unit such as the band data 310. A storage capacity of the area for the page buffer 200 reserved in the main storage unit 18 is reduced, and a cost for the image forming apparatus 1 is reduced.

In the related-art typical image forming apparatus, when the document data 500 already registered in the HDD is read, the data corresponding to a band is read from the auxiliary storage unit 19 in response to a band-basis read request, and is copied to a system memory. The data corresponding to a band is read from the HDD for each band-basis read request, which deteriorates performance. When the read requests are collectively received, the controller of the HDD performs control at all times, which deteriorates performance. Typically, software processes and hardware processes are performed in series by the CPU and the controller of the HDD, respectively.

In the image forming apparatus 1 according to the embodiment of the present disclosure, in regard to the page data 300 or the band data 310, when the request to read data corresponding to one piece of band data 310 is received, the subsequent band data 310 corresponding to the plurality of pieces of band data 310 is read from the auxiliary storage unit 19 by the thread, and is copied onto the main storage unit 18. The image forming apparatus 1 repeats the above-mentioned operation each time the read request for the band data 310 is received. As a result, the thread for reading the band data 310 reads the band data 310 other than the head piece of band data 310 from the main storage unit 18, which improves performance. The software process and the hardware process are processed in parallel, which improves the performance of the reading from the auxiliary storage unit 19.

In the related-art typical image forming apparatus, in a case where a speed of the writing to the HDD is slow, or in a case where the HDD is accessed frequently, when the writing to the HDD is performed by a single thread, a time to return the process to the control unit increases. The thread for performing the writing stands by until the subsequent writing.

The image forming apparatus 1 according to the embodiment of the present disclosure generates and activates a thread dedicated to the writing to the auxiliary storage unit 19. The thread for the writing and the thread for the reading are provided, and the process is returned to the writing side before the writing to the auxiliary storage unit 19 is performed. The writing to and the reading from the auxiliary storage unit 19 are performed in parallel, which improves operation efficiency of each thread.

In the related-art typical image forming apparatus, when such a plurality of jobs that data is subjected to simultaneous reading and writing are activated, a plurality of pages of a plurality of documents are referred to, which extremely increases the number of pieces of band data to be read. A search time to search the band data from the "head" (i.e. the front of the link list) every time increases.

The image forming apparatus 1 according to the embodiment of the present disclosure uses the link list 320 to search the band data 310 quickly by a plurality of threads and a plurality of jobs even when a logical address and a physical address at which the band data 310 is stored are different.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a plurality of buffers including a plurality of page buffers and a band buffer;
   an auxiliary storage unit;
   a data receiving unit configured to input first page data into a first page buffer from among the plurality of page buffers; and
   an asynchronous data write unit configured to asynchronously store the first page data stored in the first page buffer into the auxiliary storage unit,
   wherein,
   the data receiving unit is further configured to input band data, a unit of band data being smaller than a unit of page data, into the band buffer if the data receiving unit cannot input the page data into one of the plurality of page buffers,
   the asynchronous data write unit is further configured to asynchronously store the band data stored in the band buffer into the auxiliary storage unit, and
   the image forming apparatus comprises:
      a data transmitting unit configured to transmit the page data stored in the plurality of page buffers,
      a data prefetch unit configured to prefetch second page data stored in the auxiliary storage unit into a second page buffer from among the plurality of page buffers if, after the first page data in the first page buffer is transmitted, no page data to be subsequently transmitted exists in other page buffers in the plurality of page buffers, and
      an image forming unit configured to perform image formation using the data transmitted by the data transmitting unit.

2. The image forming apparatus according to claim 1, further comprising:
   an original reading unit configured to read an original document and store information indicative of the original document in the auxiliary storage unit.

3. The image forming apparatus according to claim 1, further comprising:
   an operation panel configured to receive user instructions for execution of the image formation.

4. The image forming apparatus according to claim 1, further comprising:
   a conveying unit configured to provide recording paper to the image forming unit.

5. The image forming apparatus according to claim 1, further comprising:
   a network communication unit configured to perform at least one of transmitting information to and receiving information from an external network.

6. The image forming apparatus according to claim 1, further comprising:

a data deletion unit configured to delete the transmitted data from the plurality of page buffers.

7. An image forming method, comprising:

inputting first page data into a first page buffer from among a plurality of buffers, the plurality of buffers including a plurality of page buffers and a band buffer;

asynchronously storing the first page data stored in the first page buffer into an auxiliary storage unit;

inputting band data, a unit of band data being smaller than a unit of page data, into the band buffer if the page data cannot be input into one of the plurality of page buffers;

asynchronously storing the band data stored in the band buffer into the auxiliary storage unit;

transmitting the page data stored in the plurality of page buffers; and performing image formation using the transmitted data, wherein the image forming method further comprises:

prefetching second page data stored in the auxiliary storage unit into a second page buffer from among the plurality of page buffers if, after the first page data in the first page buffer is transmitted, no page data to be subsequently transmitted exists in other page buffers in the plurality of page buffers.

8. The image forming method according to claim 7, further comprising:

reading an original document and storing information indicative of the original document in the auxiliary storage unit.

9. The image forming method according to claim 7, further comprising:

receiving user instructions for execution of the image formation.

10. The image forming method according to claim 7, further comprising:

providing recording paper for performing the image formation.

11. The image forming method according to claim 7, further comprising:

performing at least one of transmitting information to and receiving information from an external network.

12. The image forming method according to claim 7, further comprising:

deleting the transmitted data from the plurality of page buffers.

13. A non-transitory computer-readable medium having instructions stored thereon that, upon execution by one or more processors, cause the one or more processors to perform operations that comprise:

inputting first page data into a first page buffer from among a plurality of buffers, the plurality of buffers including a plurality of page buffers and a band buffer;

asynchronously storing the first page data stored in the first page buffer into an auxiliary storage unit;

inputting band data, a unit of band data being smaller than a unit of page data, into the band buffer if the page data cannot be input into one of the plurality of page buffers;

asynchronously storing the band data stored in the band buffer into the auxiliary storage unit;

transmitting the page data stored in the plurality of page buffers; and performing image formation using the transmitted data, wherein the operations further comprise:

prefetching second page data stored in the auxiliary storage unit into a second page buffer from among the plurality of page buffers if, after the first page data in the first page buffer is transmitted, no page data to be subsequently transmitted exists in other page buffers in the plurality of page buffers.

14. The non-transitory computer-readable medium according to claim 13, wherein the operations further comprise:

reading an original document and storing information indicative of the original document in the auxiliary storage unit.

15. The non-transitory computer-readable medium according to claim 13, wherein the operations further comprise:

receiving user instructions for execution of the image formation.

16. The non-transitory computer-readable medium according to claim 13, wherein the operations further comprise:

performing at least one of transmitting information to and receiving information from an external network.

17. The non-transitory computer-readable medium according to claim 13, wherein the operations further comprise:

deleting the transmitted data from the plurality of page buffers.

* * * * *